United States Patent
Ross et al.

(10) Patent No.: US 7,278,375 B2
(45) Date of Patent: Oct. 9, 2007

(54) ANIMAL DETERRENT APPARATUS FOR MOUNTING TO A CULVERT

(76) Inventors: Brian Charles Ross, 1203 Northlake Dr., Richardson, TX (US) 75080; James Edward Ross, 1203 Northlake Dr., Richardson, TX (US) 75080

( * ) Notice: Subject to any disclaimer, the term of this patent is extended or adjusted under 35 U.S.C. 154(b) by 0 days.

(21) Appl. No.: 11/276,921

(22) Filed: Mar. 17, 2006

(65) Prior Publication Data

US 2006/0225668 A1    Oct. 12, 2006

Related U.S. Application Data

(60) Provisional application No. 60/670,068, filed on Apr. 11, 2005.

(51) Int. Cl.
*A01K 15/02* (2006.01)
(52) U.S. Cl. .................... 119/719; 116/22 A
(58) Field of Classification Search ............ 119/712, 119/713, 719; 116/22 A
See application file for complete search history.

(56) References Cited

U.S. PATENT DOCUMENTS

| | | | |
|---|---|---|---|
| 4,658,386 A | 4/1987 | Morris | |
| 5,009,192 A | 4/1991 | Burman | |
| 5,214,411 A | 5/1993 | Herbruck | |
| 5,233,355 A * | 8/1993 | Di Stefano et al. | 341/187 |
| 5,371,489 A | 12/1994 | Carroll et al. | |
| 5,458,093 A | 10/1995 | McMillan | |
| 5,460,123 A | 10/1995 | Kolz | |
| 5,570,655 A * | 11/1996 | Targa | 119/51.02 |
| 5,602,523 A | 2/1997 | Turchioe et al. | |
| 5,603,287 A | 2/1997 | Houck | |
| 5,730,086 A | 3/1998 | Truebe | |
| 5,870,972 A * | 2/1999 | Zinter et al. | 119/719 |
| 5,892,446 A * | 4/1999 | Reich | 340/573.1 |
| 6,016,100 A | 1/2000 | Boyd et al. | |
| 6,118,375 A | 9/2000 | Duncan | |
| 6,285,630 B1 | 9/2001 | Jan | |
| 6,309,090 B1 | 10/2001 | Tukin | |
| 6,373,385 B1 | 4/2002 | Wheeler | |
| 6,460,487 B1 * | 10/2002 | Betzen | 119/712 |
| 6,615,770 B2 | 9/2003 | Patterson et al. | |
| 6,700,486 B1 * | 3/2004 | Banki | 340/541 |
| 6,856,243 B2 | 2/2005 | Smith et al. | |

* cited by examiner

*Primary Examiner*—Teri Pham Luu
*Assistant Examiner*—Willie Berry, Jr.
(74) *Attorney, Agent, or Firm*—Invention Protection Associates, LLC

(57) ABSTRACT

An automated animal deterrent apparatus for mounting to a culvert, the apparatus includes attached weatherproof housings to protect its other components; a passive infrared sensor to detect pest animals within a detection zone; a siren to produce noise; a scent releasing assembly to emit an odor; a strobe light to produce light flashes; a solar panel and battery to power the apparatus; and a tube and clamp assembly for attaching the apparatus to the end of a culvert.

8 Claims, 4 Drawing Sheets

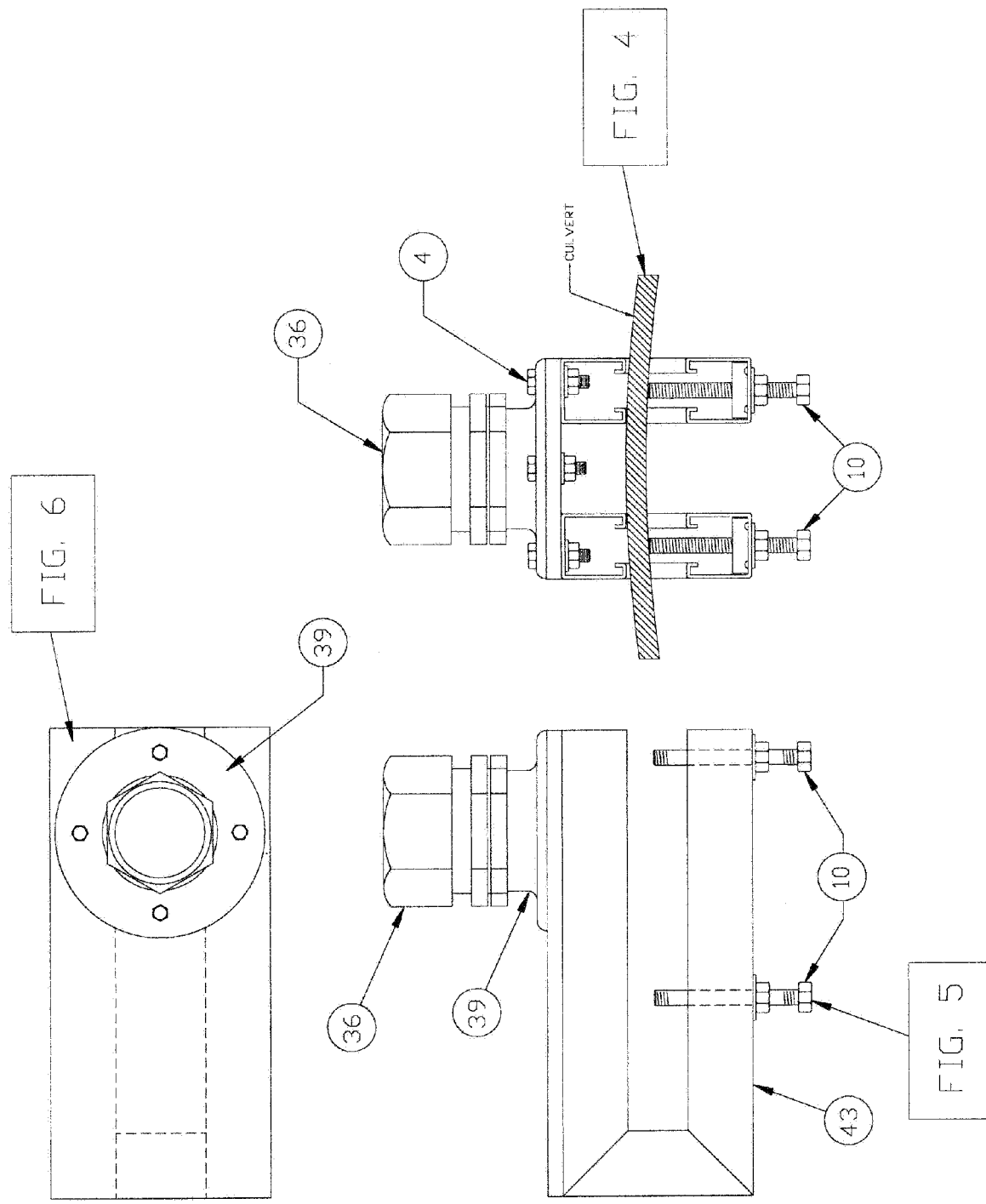

ANIMAL DETERRENT APPARATUS FOR MOUNTING TO A CULVERT

This nonprovisional application claims the benefit of provisional application 60/670,068 filed Apr. 11, 2005

BACKGROUND OF THE INVENTION

The present invention generally relates to a device for deterring pest animals from the vicinity of a culvert and is specifically directed to an apparatus that is adapted for mounting to a culvert and that produces sound, scent and light for the purposes of repelling beavers and preventing them from causing the road disruption and other property damage that may result from their damming about a culvert.

The beaver, North America's largest rodent, is an aquatic mammal that lives on a vegetarian diet of, mainly, leaves, sticks and tree bark. With their paddle-shaped feet and short legs, beavers are adept swimmers, but relatively slow land travelers. Consequently, beavers tend to spend most of their time either in or near bodies of water, as accessibility to swimmable water serves to minimize their vulnerabilities to land predators that are not inclined to pursue them in the water. So, to provide them more convenient and safer access to new food sources, beavers will make great efforts to expand their existing water habitats so as to encompass adjacent trees and vegetation that they wish to consume. To accomplish this, beavers assemble sticks, mud and rocks to effectively form dam structures in the paths of flowing water. A beaver dam can effectively stop the water's flow and force it to rise. Of course, where low-lying wooded land surrounds a water body, a rise in water level results in submersion of additional land and trees.

A location at which beavers commonly will erect a dam is in the vicinity of a culvert structure. By damming around the downstream end of a culvert, the normal flow of water exiting the culvert is blocked, and the water level is raised to form a "beaver pond." This kind of damming may be useful for the beaver, but it is quite disruptive to human life when it causes roads to flood or to develop cracks and potholes due to water saturation of the roadbed. To that point, a study conducted at Cornell University revealed that, on average, 152 man-hours of repair work and $2,500 are spent, annually, on each road culvert through which beaver dams routinely obstruct the flow of water. Clearly, beavers can present a significant financial burden to departments of transportation and other public agencies responsible for maintaining roads, and they can pose similar burdens to private landowners whose lands are flooded and whose trees are destroyed by water submersion or by beavers feeding on them.

To prevent these problems at road culverts, there are a few basic methods of beaver damage abatement that are commonly used. One such method is use of a water level control device. However, many of these devices are difficult to install. Due to a host of factors, typical water level control devices are installable at only a small percentage of all road culverts. These device also require continuous maintenance, so, they often are not the most viable solutions for preventing beaver damming—particularly, around culverts.

A second method of beaver damage abatement near culverts is use of an exclusion device that serves as a physical barrier to prevent beavers from coming within a certain distance of a culvert. For example, when a cylindrical fence is attached to and extends from the end of a culvert, beavers must form a dam much longer than they ordinarily would build in order to restrict the dispersed water flow and cause the water level to rise. However, because beavers often are capable of tunneling underneath exclusion devices to dam inside of them, such devices may be rendered ineffective.

A couple of other basic methods of preventing beaver damming are trapping and shooting. However, because of the potential enormity of the beaver population around water habitats, these methods may ultimately prove futile as well. Furthermore, in many instances, either firearms use prohibitions or animal rights considerations may dissuade one from resorting to these methods even where they potentially could be effective.

Finally, another solution for preventing beaver damming activity around a culvert, and a solution that the present invention embodies, is use of a deterrent device. For examples, U.S. Pat. No. 6,856,243 to Smith et al. and U.S. Pat. No. 5,892,446 to Reich disclose devices that detect the presence of animals and then use light and sound to ward them off. Nevertheless, it can be appreciated that there still exists a primary need for a pest animal deterrent apparatus that is specifically adapted for attachment to and use at road culverts and similar structures, principally, for preventing beaver damming thereabout. Secondarily, such an apparatus should: (1) be culvert mountable in a way that is non-intrusive and that allows for easy detachment from one culvert and redeployment to another; (2) allow for easy adjustment of its zone of detection; and (3) operate continuously off of its own power source, but with minimal power consumption and maintenance. The present invention substantially fulfills this existing need and possesses the foregoing attributes.

SUMMARY

Extensive field research indicates that different animal species respond differently to their perceptions of different frequencies, odors, lights and movements. Accordingly, it stands to reason that existing animal deterrent devices, because of differences in their alarm mechanisms, are not equally effective in repelling all pest animals. For example, some predecessor deterrent devices are designed to continuously produce odor, noise (often in the ultrasonic range and imperceptible to human ears) or other commotion for periods even when there is no strong indication that pest animals are within their vicinities. Consequently, some animals are able to simply habituate to the perceptible output of those devices or otherwise dismiss it as non-threatening.

In contrast, the apparatus of the present invention is especially effective in inducing the desired animal response because its alarm activity is unmistakably related to an animal's proximity to the apparatus. To wit, the present apparatus will sit dormant and inconspicuous, unless and until its sensor component detects the body heat of an animal moving within its detection zone. Only when detection occurs will the apparatus's alarms be triggered. More specifically, upon an animal detection, the sensor component energizes a normally open 12-volt direct current relay, sending a 12-volt current to activate an audio siren, a strobe light and a scent emitter which blare loud noise, deliver rapid light flashes and spray a familiar and repelling scent, respectively. As a result, the animal is suddenly startled, as the flickering strobe light creates the illusion of a motioning object of some sort—an illusion reinforced by the fact that the siren noise and scent are projected from the same location simultaneous to the commencement of visible light flashes.

When the apparatus is triggered into action by, for example, a beaver, the beaver will be annoyed, at minimum, and is likely to perceive the generated commotion and odor as actually threatening. In either event, the beaver's spontaneous reaction is to hurriedly flee. Accordingly, where the deterrent apparatus of the present invention is stationed atop a culvert opening about which beavers are known to congregate, the apparatus will effectively preempt beaver damming activity that can detrimentally affect the surrounding environment. Furthermore, if a once startled beaver returns to the location, the apparatus will be again triggered, and the beaver will associate that particular location to an unpleasant experience. Beyond repelling the beaver on the occasions that it actually encounters the apparatus, the apparatus induces a behavioral modification whereby the beaver begins to deliberately avoid coming near the culvert without having to be warded off.

A preferred embodiment of the present invention contemplates an animal deterrent apparatus comprised of several components including an infrared heat and motion sensor disposed within a sensor housing; an audio siren and strobe light disposed within a control housing; a scent emitter assembly; a solar panel charged battery; and culvert mounting means. The scent emitter assembly is comprised of a scent reservoir, solenoid valve, $CO_2$ cartridge and nozzle. The culvert mounting means is comprised of one or more mounting members combined with a clamping device, the mounting means allowing the apparatus to be releasably clamped to a culvert.

Its inventors contemplate the present invention being used, primarily, for the purpose of repelling North American beavers from road culverts (although, the apparatus can be used to repel other species of pest animals from the vicinity of a culvert as well), as the culvert mounting means makes the apparatus particularly suited for attachment to culverts and drainpipes. In fact, the clamping device can be securely fastened to the end of a culvert without its installer having to drill mounting holes that could be structurally damaging to the culvert. Also, the dimensional configuration of the clamping device makes it universally compatible for coupling to culvert structures. More specifically, the width of its C-shaped opening (the opening into which the end of a culvert/pipe wall is inserted for mounting thereto) is such that the clamping device can be fitted over the edge of a flat-walled culvert as well as that of any typical cylindrical-walled culvert equally securely.

Another virtue of the culvert mounting means is that the mounting member(s) can be of whatever length and configuration is necessary to provide the sensor an unobstructed view of the installer's intended detection zone. For example, if tree limbs hang before the point that the clamping device is to be attached, a mounting member can serve to effectively prop the sensor into a position at which it has a clear path to the detection zone. To that end, some embodiments of the apparatus include multiple mounting members comprising electrical metallic tubes ("EMT") linked, at their ends, by EMT connectors and an EMT coupling. However, a single EMT can be used, or as many tubes as are necessary can be linked together by connectors and couplings to comprise mounting means configured for optimally mounting the sensor and alarms above, below or lateral to the particular point along a culvert at which the clamping device is to be secured to the culvert.

Portability is another advantage of the present apparatus. A user can unfasten the clamping device from a culvert wall and transport the entire apparatus to another culvert. Alternatively, a user can detach the mounting member from the clamping device and then remove that mounting member and the rest of the apparatus from the culvert while the clamping device remains fastened to the culvert. The latter is particularly advantageous to a user when, for a variety of reasons, the proposition of detaching a mounting member from a connector is less difficult than that of unfastening the clamping device from the culvert wall.

It is an object of the invention to provide an automated animal deterrent apparatus that is specifically adapted for attachment to a culvert and that can be easily detached from one culvert and reattached to another. With its culvert mounting means, the present invention can be easily mounted upon and subsequently removed from a culvert structure without requiring any drilling or otherwise causing damage to the culvert. The culvert mounting means also can be of varying length, allowing the sensor and alarms to be propped to a vantage point at which there is a clear line of sight between those apparatus components and a detection zone. Furthermore, the apparatus includes its own source of power; so, proximity to an extrinsic power source is not a consideration that restricts where the deterrent apparatus can be deployed.

It is another object of the invention to provide an animal deterrent apparatus that can be easily manipulated to survey an optimum detection zone about a culvert upon which the apparatus is mounted. In addition to having versatility in its culvert mounting means, the apparatus features adjustability in its sensor mounting assembly, allowing the sensor to be fixed into position anywhere along a 180° range of horizontal rotation and a 90° range of vertical rotation. Therefore, the sensor can be rotated so that a user may aim the sensor at the precise direction from which the user believes a beaver is most likely to approach the culvert.

It is another object of the present invention to provide an animal deterrent apparatus that can operate continuously upon minimal power. Since electric current is sent to energize the alarms only upon an instance of the sensor detecting an object emitting a required amount of infrared heat, power is consumed only on an as needed basis. Also, the sensor includes a sunlight sensitivity setting that, essentially, allows a user to regulate at what times of day the sensor will operate.

Similarly, it is yet another object of the invention to provide an animal deterrent apparatus whose alarms are triggered only by the presence of an actual pest animal. The invention uses a passive infrared heat and motion sensor that detects passive infrared radiation that is emitted by the bodies of living animals. The sensor is capable of detecting a temperature differential, between the ambient temperature and the temperature of a sensed object, as minimal as one degree Fahrenheit. In a preferred embodiment of the present invention, the sensor includes a sensitivity setting which, essentially, allows a user to calibrate the sensor to distinguish, for alarm detonation purposes, larger pest animals (such as beavers) from smaller, less problematic animals and benign objects.

BRIEF DESCRIPTION OF THE DRAWINGS

FIG. 4 is a front elevation view of the clamping device and related components of the apparatus while attached to a culvert wall;

FIG. 5 is a side elevation view of the clamping device and related components of the apparatus; and FIG. 6 is a top plan view of the clamping device and related components of the apparatus.

DETAILED DESCRIPTION OF THE PREFERRED EMBODIMENTS

Figure 1:
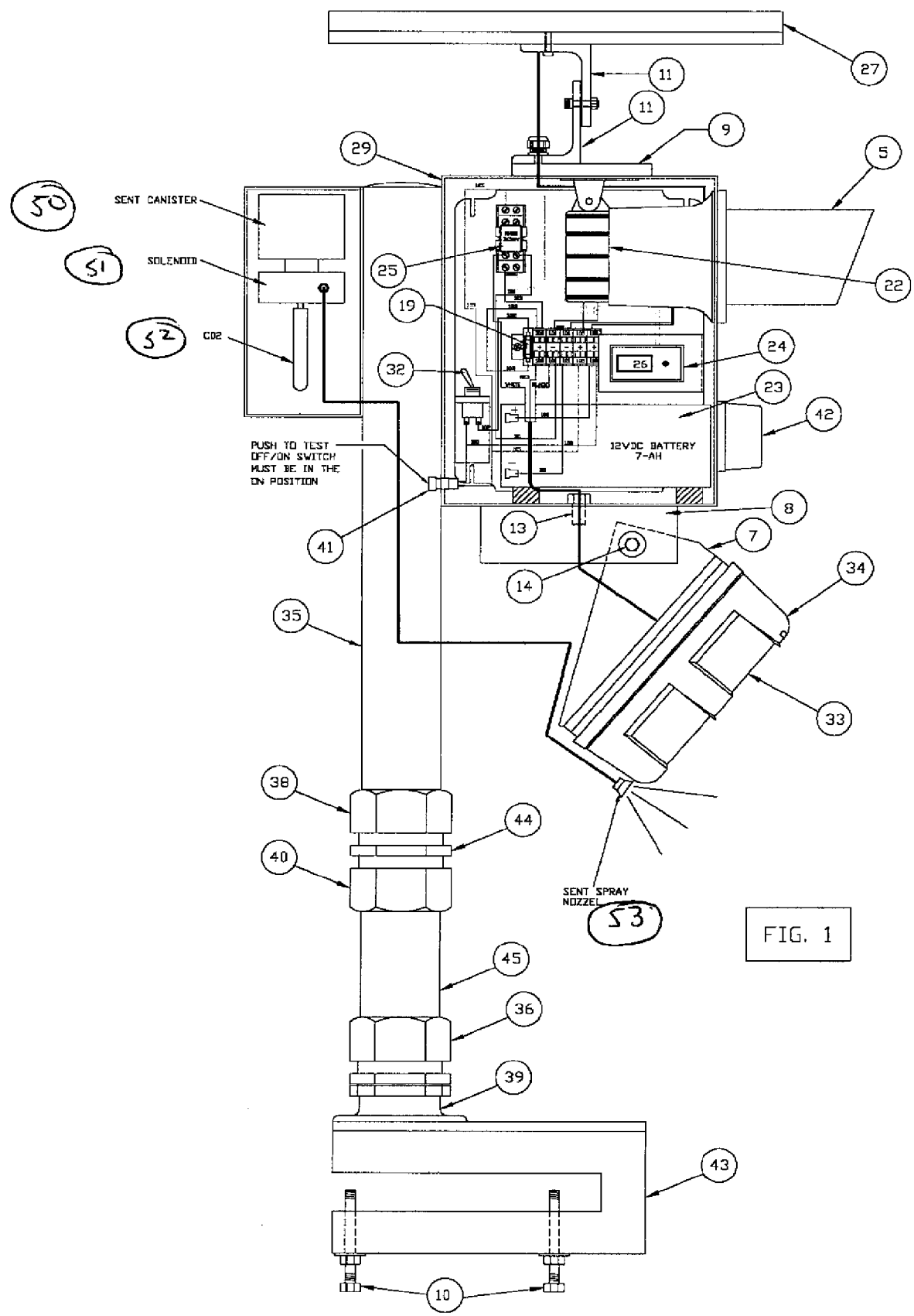
FIG. 1 is a right side elevation view of the animal deterrent apparatus of the present invention, wherein the right side of the control housing is not shown to allow components within the control housing to be viewable.

The animal deterrent apparatus of the present invention employs several integrated components. FIG. 1 is a schematic illustrating a preferred embodiment of the present invention, an embodiment whose major components include: an audio siren 22 and a strobe light 42 (together with the scent emitting parts mentioned below, referred to as "alarms"), a relay 25 and a battery 23—each of the aforementioned components disposed within a weatherproof control housing 29; a sensor 33 disposed within a weatherproof sensor housing 34; a scent reservoir 50, solenoid 51, and spray nozzle 53; a solar panel 27; and culvert mounting means comprising, primarily, a first mounting member 35, a second mounting member 45, a clamping device 43 and a clamp connecting assembly.

The control housing 29 is affixed to the first mounting member 35 at or near the proximal end of the mounting member 35. Preferably, the mounting members are metal tubes, as depicted in FIG. 1. However, mounting members, alternatively, can be fabricated from other rigid material having substantially elongate configurations and capable of being affixed to the control housing 29 and supporting the aggregate weight of the two housings 29 and 34 and their contents, the solar panel 27 and the various other components that structurally and electronically interconnect them.

The scent reservoir 50 is also affixed to the first mounting member 35. The reservoir 50 contains liquid, such as coyote or bobcat urine, of a scent that is likely to frighten beavers. The flow of scented liquid from the reservoir 50 to the environment, via the spray nozzle 53, is regulated by a solenoid valve 51 in electronic communication with the sensor 33.

At the distal end of the first mounting member 35 is an EMT connector 38 of a type well known in the industry. Similarly, at the proximal end of the second mounting member 45 is another EMT connector 40. The distal end of the first mounting member 35 is linked to the proximal end of the second mounting member 45 by way of the EMT connectors 38 and 40 being adjoined by an EMT coupler 44 of a type also well known in the industry. The distal end of the second mounting member 45 is linked to the clamping device 43 by way of a clamp connecting assembly which is comprised of another EMT connector 36, a pipe flange 39 and a plurality of flange bolts 4, as shown in FIG. 4-6.

Although the accompanying drawings disclose an embodiment of the apparatus that includes two mounting member components, in an alternative embodiment, a single mounting member 35 can be used to prop the control housing 29, sensor housing 34 and solar panel 27 above (or below or some lateral distance from) the clamping device 43 when it is attached to a culvert wall. In such an alternative embodiment of the invention, the distal end of the single mounting member 35 is directly connected to the clamp via the above-described clamp connecting assembly.

The animal deterrent apparatus can be mounted atop a culvert structure by fitting the clamping device 43 over the end of a culvert wall and securing the clamping device 43 thereto by tightening a plurality of clamp bolts 10, as shown in FIG. 4. Thereafter, the entire apparatus can be detached from the culvert by loosening the bolts 10 and sliding the clamping device off the end of the culvert. Alternatively, the clamping device 43 and clamp connecting assembly can be left secured to the culvert wall while the rest of the apparatus is removed by simply disengaging either the connector 38 from the coupler 44 or the connector 36 from the flange 39.

Figure 2:
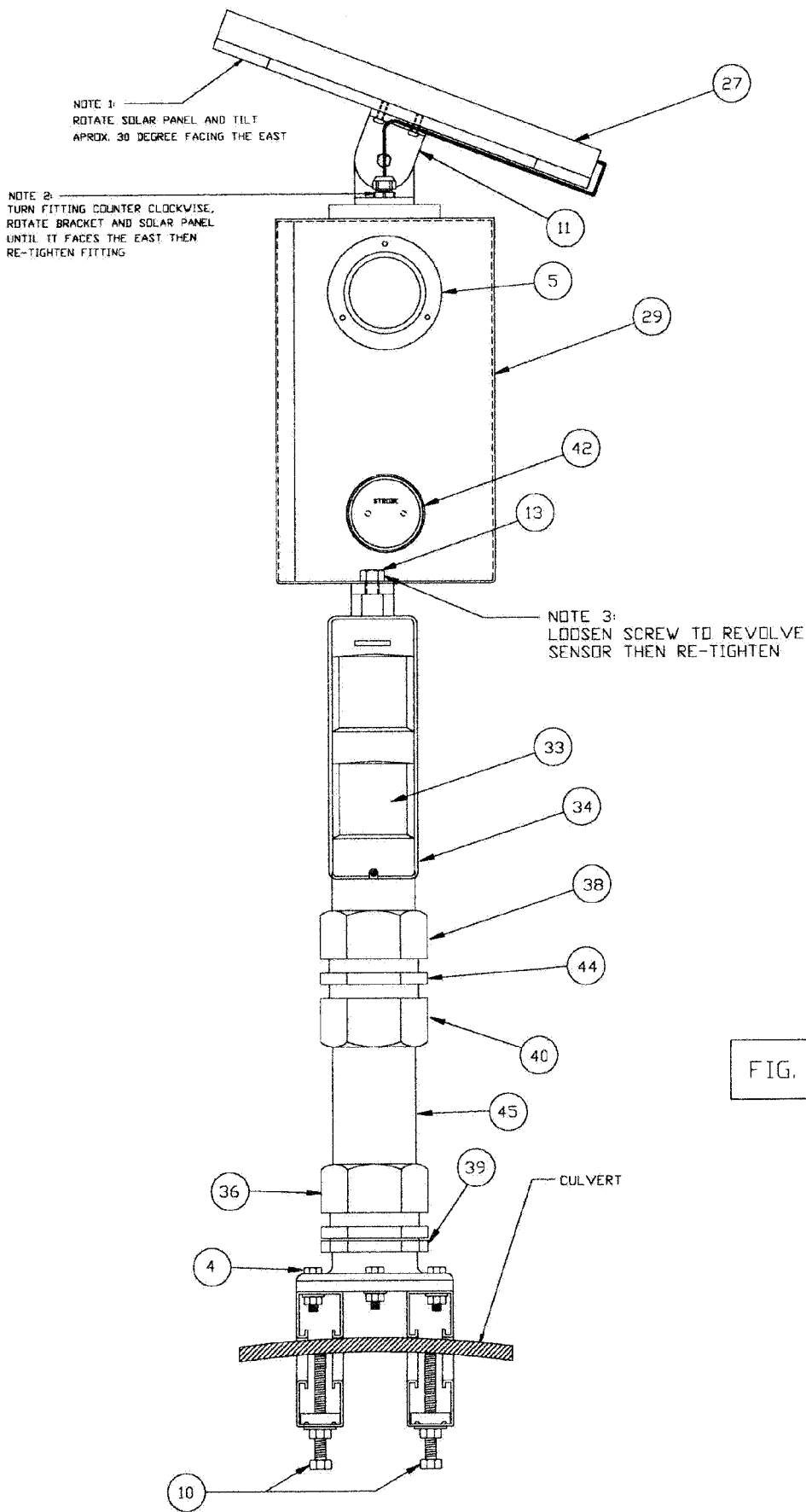
FIG. 2 is a front elevation view of the animal deterrent apparatus.

In a preferred embodiment, power is supplied to the apparatus by a combination of a solar panel 27 and battery 23. The solar panel 27 is bracketed to the top surface of the control housing 29 and is wired to the battery 23 therein. From viewing FIG. 2, one can see how the dual bracket assembly 11 by which the solar panel 27 is connected to the control housing 29 allows the solar panel 27 to be rotated horizontally, tilted vertically and fixed to face a skyward direction in which the sun is likely to be found in relation to the stationed apparatus. During daylight hours, the solar panel 27 absorbs sunlight, converts it to electricity and transfers the electricity to the battery 23 for storage and use by the sensor 33, siren 22 and strobe light 42.

The sensor housing 34 is pivotably attached to the bottom surface of the control housing 29 by way of dual sensor mounting brackets 7 and 8. When bolt 13 is loosened, bracket 8 can be rotated, relative to the bottom surface of the control housing 29, approximately 180° horizontally. Similarly, when bolt 14 is loosened, bracket 7 can be rotated, relative to bracket 8, approximately 90° vertically. Conversely, one can simply tighten bolts 13 and 14 to secure the sensor housing 34 to the bottom of the control housing 29 at a fixed position in which the heat and motion sensor 33 is pointed toward a desired sensor detection zone.

In a preferred embodiment, the sensor 33 disposed within the sensor housing 34 is a passive infrared ("PIR") sensor capable of detecting a moving object having a body temperature differential as minimal as 1° F. above the ambient air temperature. A Takex™ model MS-12TE or PIR sensor of similar sensing capabilities will suffice. However, other PIR sensors, as well as different sensing devices altogether, could be employed. Nevertheless, when the sensor 33 detects a triggering object, the sensor 33 outputs an alarm signal through a wire to the relay 25 disposed within control housing 29. In turn, electric currents are sent, via separate wires, to simultaneously activate the siren 22, strobe light 42 and solenoid valve 51. Upon activation, the following three things occur: (1) the siren 22 produces loud noise (preferably, in the range of 120-140 dB) that is directionally projected through a tubular shroud 5 extending from the control housing 29; (2) the strobe 22 rapidly emits flashes of light; and (3) the solenoid valve allows scented liquid to flow the scent reservoir 50, and that liquid is force out of the nozzle 53 by the pressurized release of gas from a $CO_2$ cartridge 52. The combination of noise, light and odor startles and repels pest animals such as beavers.

Figure 3:
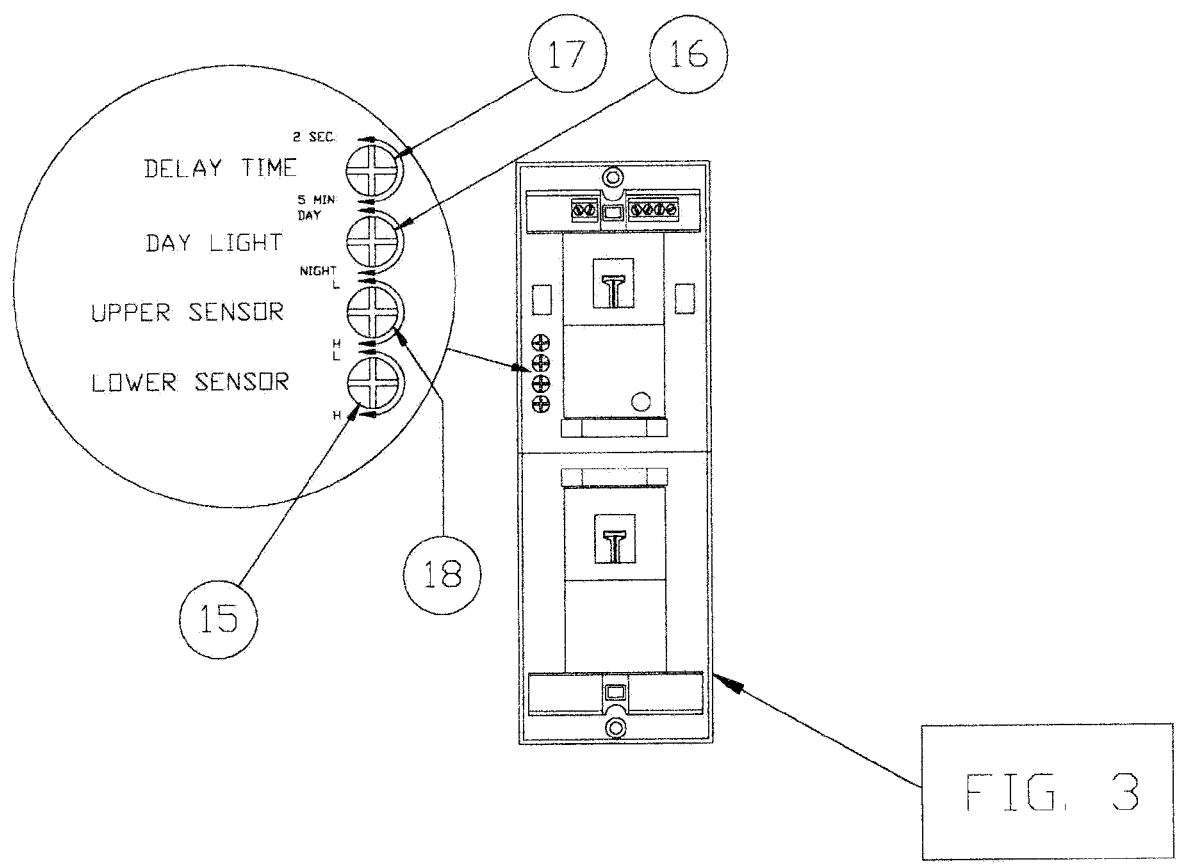
FIG. 3 shows the manually adjustable sensor settings for the animal deterrent apparatus.

As illustrated in FIG. 3, in a preferred embodiment of the present invention, the sensor 33 includes a plurality of manually adjustable sensor settings. More specifically, a first sensor setting 15 allows a user to adjust the infrared heat sensitivity of the sensor 33 such that the sensor 33 produces an alarm signal only upon detecting an object emitting infrared heat of at least a magnitude selected by the user. Sensor setting 15, effectively, permits a user to set the apparatus to be triggered by a limited set of moving objects that may come within the sensor's detection range, as distinguished by their varying heat signatures.

A second sensor setting 16 allows a user to adjust the sensor's sensitivity to light such that a user may regulate sensor operability to be dependent upon the presence of sunlight. For example, setting 16 could be alternatively positioned for daytime only (sunlight present), nighttime only or day/night continuous operation of the sensor 33. Finally, a third sensor setting 17 functions as an adjustable timer which allows a user to select the time duration for which the siren 22, solenoid valve 51 and strobe light 42 will emit sound, scent and light, respectively, after being synchronously activated upon an alarm signal having been issued by the sensor 33.

In a preferred embodiment of the present invention, a user may use sensor setting 17 to select an alarm activation time of anywhere from two seconds to five minutes. Therefore, once the alarms are activated, the sensor 33 will not automatically reset and become operationally ready to produce a subsequent output signal until after the user selected alarm activation time has elapsed. Also included in a preferred embodiment is an electronic counter device 24 of a type well known in the art. The counter 24 records the number of alarm signals outputted by the sensor 33, and it can be manually reset to a zero count. Therefore, a user can determine the number of times that the sensor 33 triggered the alarms during a given timeframe.

The battery 23, preferably, is a 12-volt battery wired for supplying power to the siren 22, solenoid valve 51 and strobe light 42. A fuse 19 is wired between the battery 23 and the alarm components to prevent overcharging of the alarms. A user can turn power to the apparatus on and off by manipulating either an inside switch 32 concealed within the control housing 29 or an outside switch 41 protruding through a small opening in the control housing 29. In the embodiment of the invention depicted in FIG. 1, the inside switch 32 is a toggle switch, and the outside switch 41 is a button switch. Nevertheless, any conventional electric switch will suffice for either.

Although the present invention has been described in considerable detail and with reference to and illustration of a preferred version, it should be understood that other versions are contemplated as being a part of the present invention.

We claim:

1. An animal deterrent apparatus comprising:
    a sensor capable of detecting passive infrared radiation emitted by an animal present within the sensor's detection zone;
    a strobe light in electrical communication with the sensor, the strobe light for emitting light flashes upon being activated by the sensor;
    a siren in electrical communication with the sensor, the siren for emitting sound upon being activated by the sensor; and a culvert mounting assembly for releasably securing the apparatus to a culvert; wherein the culvert mounting assembly comprises:
    a clamping device; and
    a mounting member for connecting the clamping device to the rest of the apparatus.

2. The animal deterrent apparatus of claim 1, wherein said sensor comprises a passive infrared heat and motion sensor.

3. The beaver deterrent apparatus of claim 2, wherein said sensor further comprises the following adjustable settings:
    a first setting which adjusts the sensitivity of said sensor to passive infrared heat and motion;
    a second setting which adjusts the sensitivity of said sensor to sunlight, whereby the second setting regulates operability of said sensor based upon the level of sunlight present; and
    a third setting which adjusts the duration of time for which said siren and said strobe light will remain active.

4. The animal deterrent apparatus of claim 2, wherein said sensor further comprises a resettable counter for counting the number of times that said sensor is actuated.

5. The animal deterrent apparatus of claim 1, wherein said apparatus further comprises a power source consisting of either:
    a battery; or
    a solar panel in electrical communication with a battery, wherein the solar panel captures sunlight and converts it to electricity to be stored in the battery.

6. The animal deterrent apparatus of claim 1, further comprising a scent releasing assembly in electrical communication with the sensor, the scent releasing assembly for emitting scent upon being activated by the sensor.

7. The animal deterrent apparatus of claim 6, wherein said scent releasing assembly comprises:
    a reservoir containing a scented fluid;
    a solenoid for regulating release of the scented fluid from the reservoir; and
    a nozzle for dispersing the fluid into the environment.

8. The animal deterrent apparatus of claim 1, further comprising:
    a first housing within which said siren and said strobe light are disposed; and
    a second housing within which said sensor is disposed, the second housing being pivotably attached to the first housing to allow adjustment of said sensor's detection zone.

\* \* \* \* \*